United States Patent [19]

Roussin et al.

[11] Patent Number: 4,703,838

[45] Date of Patent: Nov. 3, 1987

[54] RECOIL DAMPER FOR A RECIPROCATING MEMBER

[75] Inventors: Michael A. Roussin; Delwin E. Cobb, both of Peoria, Ill.

[73] Assignee: Caterpillar Tractor Co., Peoria, Ill.

[21] Appl. No.: 422,606

[22] Filed: Sep. 25, 1982

Related U.S. Application Data

[63] Continuation of Ser. No. 245,246, May 27, 1980, abandoned.

[51] Int. Cl.⁴ ............................................. F16F 9/348
[52] U.S. Cl. ......................... 188/316; 37/DIG. 18; 172/40; 173/139; 188/281; 267/137
[58] Field of Search .............. 188/281, 284, 312, 313, 188/316, 317, 320; 267/119, 126, 127, 130, 137; 173/139; 92/134; 37/DIG. 18; 172/40

[56] References Cited

U.S. PATENT DOCUMENTS

| | | | |
|---|---|---|---|
| 2,497,972 | 2/1950 | Beecher | 188/316 |
| 2,595,239 | 5/1952 | Gay | 188/316 X |
| 2,788,092 | 4/1957 | Whisler, Jr. | 188/320 |
| 3,606,297 | 9/1971 | Webb | 267/125 |
| 3,645,021 | 2/1972 | Sonerud | 173/119 X |
| 3,770,322 | 11/1973 | Cobb et al. | 172/40 X |
| 3,868,145 | 2/1975 | Cobb et al. | 172/40 X |
| 3,910,357 | 10/1975 | Nancarrow | 173/131 |
| 3,922,017 | 11/1975 | Cobb | 173/43 X |
| 4,018,135 | 4/1977 | Lance | 92/134 X |
| 4,030,566 | 6/1977 | Cobb et al. | 184/6.2 |
| 4,038,905 | 8/1977 | DuPont, Jr. et al. | 188/312 X |
| 4,065,112 | 12/1977 | Leskovec et al. | 267/126 X |
| 4,076,324 | 2/1978 | Kroth | 303/6 R |
| 4,363,365 | 12/1982 | Nikolaev et al. | 173/139 |

FOREIGN PATENT DOCUMENTS

| | | | |
|---|---|---|---|
| 537375 | 2/1957 | Canada | 188/317 |
| 736718 | 6/1943 | Fed. Rep. of Germany | 267/8 R |
| 928811 | 6/1955 | Fed. Rep. of Germany | 188/284 |
| 1064843 | 12/1953 | France | 188/316 |
| 1068251 | 2/1954 | France . | |
| 1364607 | 5/1964 | France . | |
| 2300940 | 9/1976 | France . | |
| 2433134 | 3/1980 | France . | |
| 456908 | 4/1950 | Italy | 188/316 |
| 583291 | 12/1977 | U.S.S.R. | 173/139 |

Primary Examiner—George E. A. Halvosa
Attorney, Agent, or Firm—Phillips, Moore, Lempio & Finley

[57] ABSTRACT

A recoil damper (10) for a reciprocating member (12) mounted in a housing (24) includes a annular ring (38,138) mounted adjacent a shoulder (28) formed on the reciprocation member, the annular ring (38,138) mounted in a viscous fluid interior of the housing. The annular ring (38,138) cooperates with the shoulder (28) of the reciprocating member (12) to allow a relatively free flow of the viscous fluid around the shoulder (28) upon motion of the reciprocating member (12) in one direction and to restrict flow of the viscous fluid around the shoulder (28) upon motion of the reciprocating member (12) in the other opposite direction.

11 Claims, 3 Drawing Figures

RECOIL DAMPER FOR A RECIPROCATING MEMBER

This is a continuation of Ser. No. 245,246, filed May 27, 1980, now abandoned.

TECHNICAL FIELD

This invention relates to rock-breaking machinery. In particular it relates to a recoil damper for the reciprocating member of such machinery.

BACKGROUND ART

In reciprocating machinery, and particularly rock breakers, there is a requirement to dampen the motion of the reciprocating machanism on the recoil stroke. In some rock breakers an eccentric mechanism provides intermittent power strokes to the rock breaker tip or shank through an intermediate impact link located between the eccentric and the shank. In the earlier impact devices the shank was usually impacted directly by the eccentric ring. A seal was generally provided between the shank and the housing. The seal generally experienced a short life due to the large number of cycles and large displacement (8½ to 9 cm) during each cycle. Recoil of the shank was absorbed by conventional dampening devices located exterior of the drive mechanism. An example of such an exterior recoil damper is found in U.S. Pat. No. 3,868,145.

With the advent of a limited displacement (1½ cm) type intermediate impact link positioned between the eccentric and the shank, the intermediate impact link itself must be dampened as it is relatively free floating in comparison to the more conventional shank and eccentric. That is, the intermediate impact link, being located between the enclosed eccentric and the exterior shank, transmits the force of the eccentric to the shank. In order to provide relatively free movement toward the shank, the intermediate impact link is mounted in appropriate bearings positioned in the housing. However, upon recoil, the recoil force would ordinarily be transmitted to the eccentric thus causing excessive wear on the eccentric unless some form of recoil damper is used.

In such intermediate impact link type rock breakers, the force to be applied to the shank ordinarily does not occur until the shank is displaced rearwardly to engage the intermediate impact link which is also displaced rearwardly into position to be contacted by the eccentric. As the eccentric rotates so that its periphery contacts the intermediate impact link, the force of the eccentric is transmitted through the intermediate impact link to the shank which in turn acts on the working surface. As the eccentric continues to rotate, the force is relieved from the intermediate impact link, thus permitting the shank to recoil with such recoil transmitted to the intermediate impact link. Although the motion of the shank could be dampened in the manner shown in U.S. Pat. No. 3,868,145, that is an exterior damper may be mounted adjacent the shank, the recoil motion of the intermediate impact link which is contained substantially within the housing must also be dampened.

The present invention is directed to overcoming one or more of the problems as set forth above.

DISCLOSURE OF THE INVENTION

In one aspect of this invention, a recoil damper comprises a housing having an impact link reciprocally mounted therein for movement in first and second opposite directions, a shank having a tip thereon and eccentric means for intermittently reciprocating the impact link and shank. The impact link has a radial flange and first and second cavities, containing a damping fluid, are defined in the housing on opposite sides of the flange. Damping means restricts flow of the damping fluid from the second cavity to the first cavity in response to compression of damping fluid in the second cavity by the flange when the impact link is moved in its first direction and permits relatively free flow of damping fluid from the first cavity to the second cavity in response to compression of damping fluid in the first cavity by the flange when the impact link is moved in its second direction.

In another aspect of this invention, a hydraulic piston damper, also suitable for use in other types of machinery requiring damping, comprises a housing having a piston bore providing opposite end portions, a fluid cavity in the housing communicating with the piston bore intermediate end portions and a reciprocal piston axially slidably disposed in the piston bore and having a radially outwardly extended flange projecting into the cavity in fluid pumping relation to a fixed volume of trapped fluid within the cavity. A damper control member is disposed for axial sliding movement within the cavity, relative to the flange, and provides a restricted orifice. Spring means biases the control member toward a position blocking the flow of fluid past the flange to force fluid through the orifice in dampening relation to movement of the piston in one axial direction of travel with the control member being responsive to fluid pressure within the cavity for movement to a position providing substantially unrestricted flow of fluid past the flange during travel of the piston in an opposite axial direction.

The present invention dampens the motion of a reciprocating member in one direction while permitting relatively free movement of the reciprocating member in the other opposite direction. This recoil dampening is particularly appropriate in those devices such as rock breakers that require a force to be imparted to a tool, which may result in the recoil force of the tool being imparted back to the machine.

BEST MODE OF CARRYING OUT THE INVENTION

Figure 1:
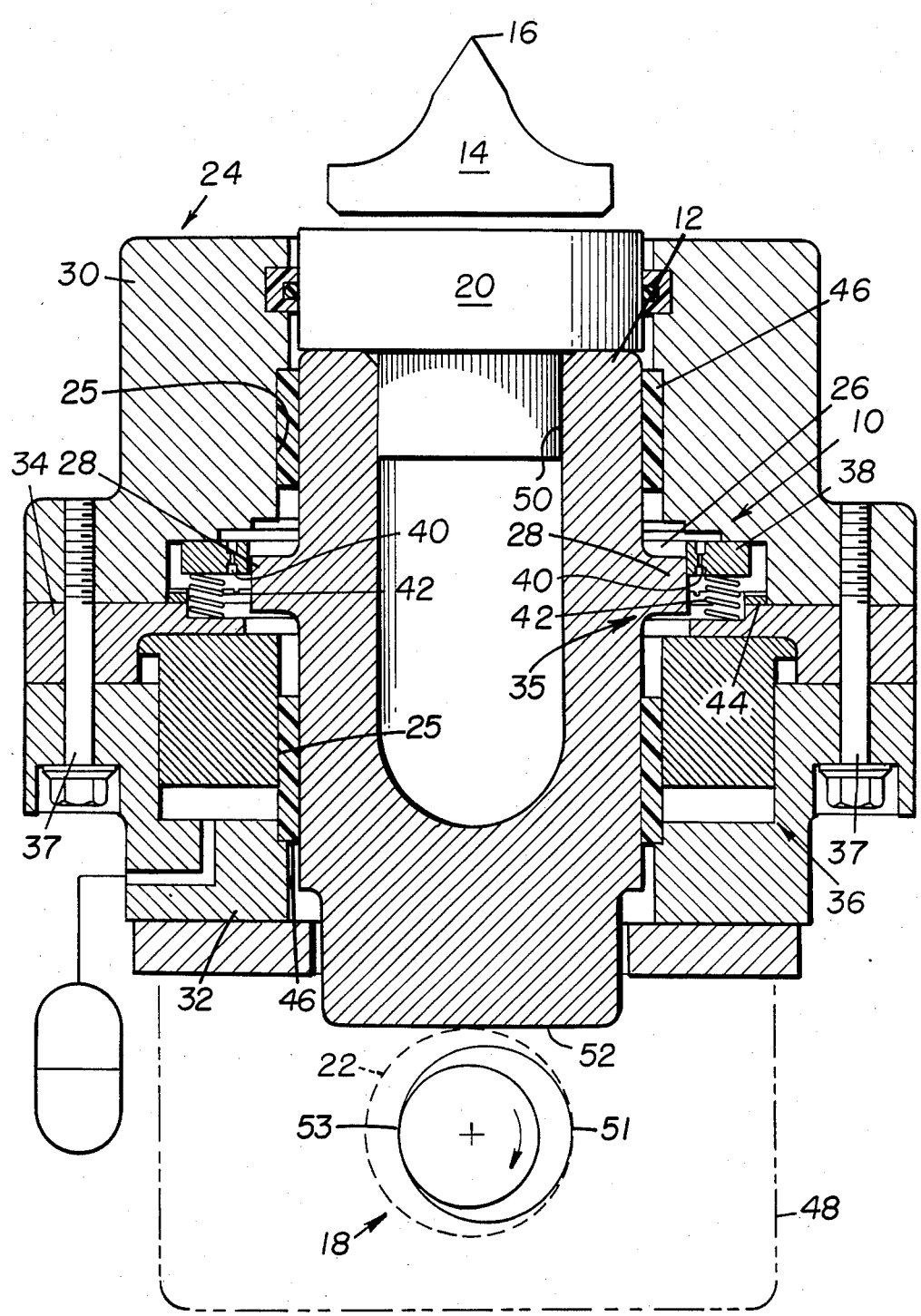
FIG. 1 is a schematic view, partly in section, of an embodiment of a recoil damper as used with an intermediate link of a rock breaker.

Referring to FIG. 1, a recoil damper 10 is shown wiht an intermediate impact link 12 of an impact type rock breaker.

The impact type rock breaker consists of a shank 14 having as a portion thereof a rock breaker tip 16 used to impact and thus break rock. An eccentric mechanism 18 provides intermittent power strokes to intermediate impact link 12 which in turn are transmitted to shank 14. It should be noted that FIG. 1 illustrates the rock breaker in the "at rest" condition. As the rock breaker tip 16 is brought into contact with the material to be broken, the shank 14, which is pivoted from a mounting (not shown), is in turn brought into contact with a portion 20 of intermediate impact link 12. Further imposition of force by rock breaker tip 16 against a surface to be broken results in intermediate impact link 12 moving downwardly as shown in FIG. 1 or in a first direction thus bringing the intermediate impact link 12 into the range of eccentric 18. This range is denoted by the dashed circle 22 in FIG. 1. As eccentric 18 rotates, it will contact intermediate impact link 12 to urge it in a second opposite direction.

Housing 24 defines a bore 25 in which intermediate impact link 12 is slidably positioned. Also defined in housing 24 is a cavity 26 generally adjacent the midpoint of bore 25 of housing 24. Intermediate impact link 12 is preferably cylindrical and has a flange 28 extending generally about the midpoint thereof. The flange 28 is adapted to be received in the cavity 26.

In order to form cavity 26 and to concurrently receive flange 28, housing 24 must be made in at least two portions, front portion 30 and rear portion 32. In the embodiment shown in FIG. 1, a mid portion 34 is also utilized to facilitate installation of other centering devices 36 utilized to center intermediate impact link 12 in housing 24. Appropriate fastening means 37, in this instance elongated bolts, are utilized to interconnect the various portions of housing 24.

Damping means 35 for retarding movement of the reciprocating intermediate impact link 12 are located in cavity 26. These means include an annular ring 38 which, in this embodiment, is formed to slidably move on flange 28 of intermediate impact link 12 in said first and second directions. Formed in annular ring 38 are a plurality of orifices 40. Each orifice 40 is oriented in the axial direction thus permitting communication of a viscous fluid which also forms a portion of the means for retarding recoil and which is located in cavity 26.

Figure 2:
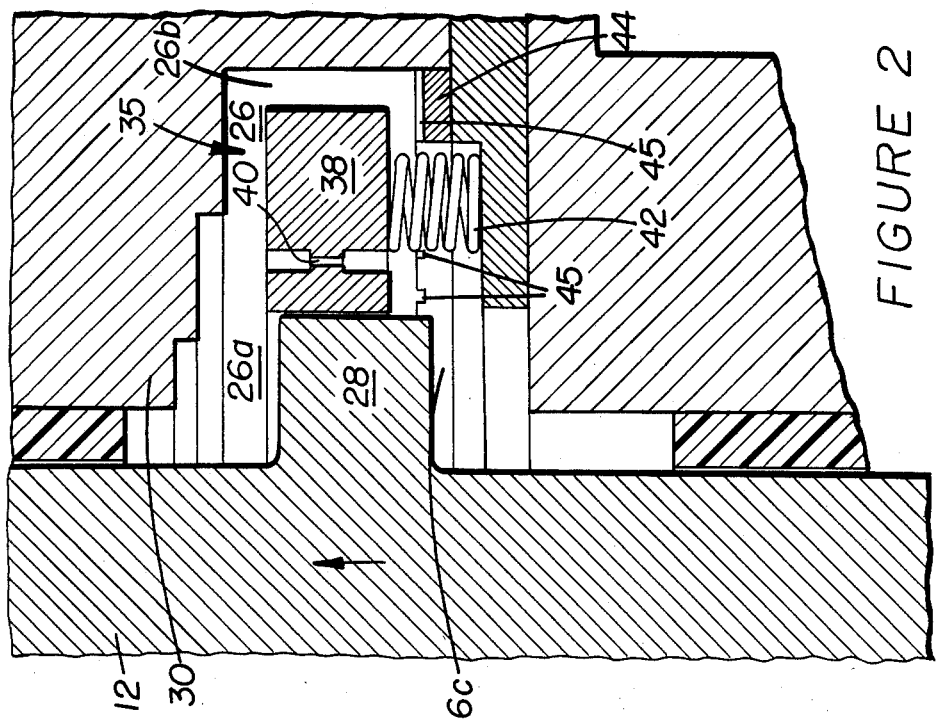
FIG. 2 is a detailed sectional view of the embodiment of the recoil damper shown in FIG. 1.

Annular ring 38 is biased toward front portion 30 housing 24 by a plurality of resilient members such as helical springs 42. Located at the rearward end of cavity 26 is a stop 44. Referring to FIG. 2, it can be seen that stop 44 may also be an annular ring which is located adjacent the outer portion of cavity 26. The inner diameter of stop 44 is less than the outer diameter of annular ring 38, so that upon movement of annular ring 38 downwardly as shown in FIG. 2, ring 38 will contact stop 44 before coming into contact with housing 24. A plurality of grooves 45 are formed in the upper surface of stop 44 so that fluid trapped in cavity 26a and cavity 26b with annular ring 38 seated or in close proximity to stop 44 may pass thereby into cavity 26c.

It can be seen in FIG. 1 that intermediate impact link 12 is journaled by appropriate bearings 46 in housing 24. Bearings 46 are preferably relatively fluid tight and thus also substantially impervious to deleterious material which could affect the operation of eccentric 18. It should be understood that eccentric 18, which is driven by a prime mover (not shown), is preferably sealed in a chamber 48 which may also be filled with lubricant or the like. At the other opposite end of intermediate impact link 12 is portion 20 which, as shown in FIG. 1, need not be integral with intermediate impact link 12, but rather be received in a central bore 50 of intermediate impact link 12. This particular construction is appropriate to provide a replaceable portion of the intermediate impact link 12.

INDUSTRIAL APPLICABILITY

Referring to FIG. 1, a recoil damper 10 is shown in the environment of a rock breaker which consists of a shank 14, an intermediate impact link 12, and an eccentric 18. The intermediate impact link 12 is mounted in the housing 24 for movement in first and second opposite directions.

As shown in FIG. 1, the rock breaker embodiment is in the "at rest" condition with intermediate impact link 12 just resting on the range circle 22 of eccentric 18. Bringing the rock breaker tip 16 into contact with a working surface (not shown) results in shank 14 moving downwardly as shown in FIG. 1 into contact with portion 20. Further movement of rock breaker tip 16 downwardly results in intermediate impact link 12 moving downwardly against the centering forces of devices 36. As point 51 of eccentric 18 moves around circle 22, contact is made with surface 52 of intermediate impact link 12 by eccentric 18 at a point on the surface thereof between point 53 (on the base circle of eccentric 18) and point 51. As a result of this contact, intermediate impact link 12 is thrust upwardly in FIG. 1 causing shank 14 to impart the force of eccentric 18 against the working surface or rock.

Referring to FIG. 2, the link 12 is shown in its movement in a second direction during the force stroke toward the working surface. The viscous fluid contained in cavity 26 has been partially compressed in front of the leading edge of flange 28 thus forcing annular ring 38 downwardly against the biasing force of helical spring 42. This movement allows relatively free flow of fluid from the forward portion of cavity 26 denoted as 26a in FIG. 2 around the flange 28 and annular ring 38 through the annular cavity 26b formed between the outer surface of annular ring 38 and cavity 26 and into the area 26c behind flange 28 and annular ring 38. As intermediate impact link 12 reaches its full forward or up position, the helical spring 42 urges annular ring 38 back toward the position shown in FIG. 1. When recoil motion starts, fluid in portion 26c of cavity 26 is influenced by flange 28 moving downwardly. With annular ring 38 in the up position as shown in FIG. 1, fluid is then forced to escape through orifice 40 into cavity 26a thus restricting or retarding movement of the intermediate impact link 12 in the downward direction.

The device 36 serves to center intermediate impact link 12 generally at a mid position as shown in FIG. 1 so that without rock breaker tip 16 being in contact with a working surface, the intermediate impact link 12 will remain out of contact with eccentric 18. Finally, stop 44 limits movement of annular ring 38 downwardly during the force stroke. Should annular ring 38 contact stop 44 or come in close proximity thereto during the upward stroke of link 12, grooves 45 will allow the flow of fluid from cavity 26a to cavity 26c. By appropriate sizing of the cavities, annular ring 38 need never come in contact with stop 44 except in extreme conditions.

A SECOND MODE FOR CARRYING OUT THE INVENTION

Figure 3:
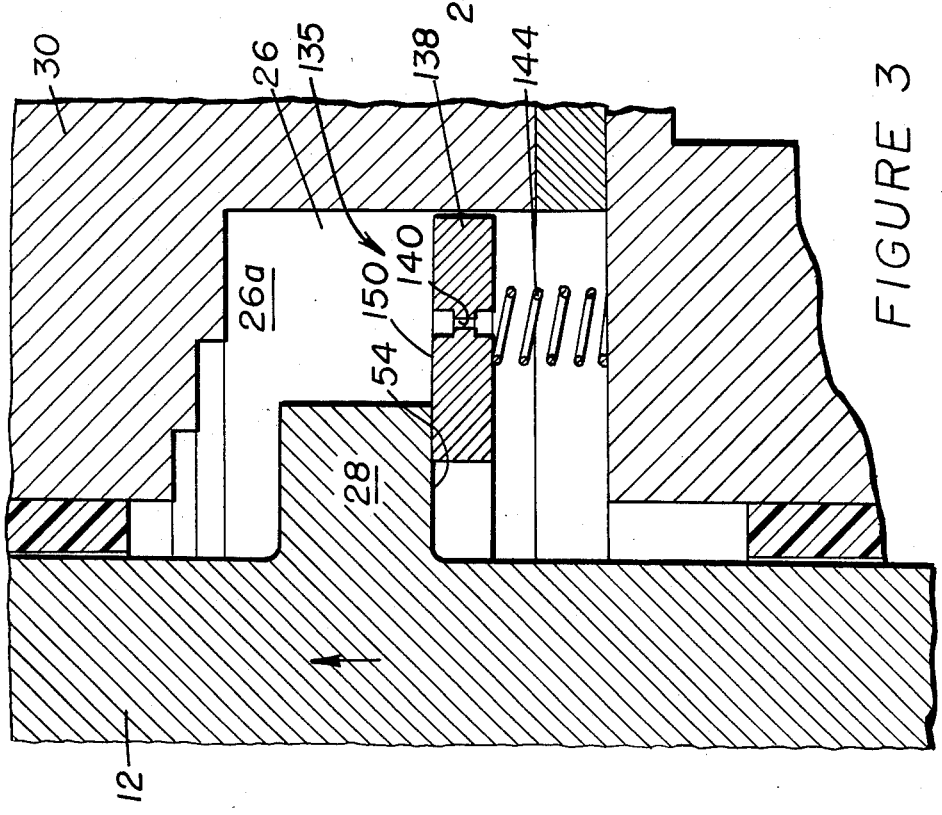
FIG. 3 is a schematic view of an alternate embodiment of the recoil damper.

Referring now to FIG. 3, a second mode for carrying out this invention is the same environment is shown. The like parts are denoted by the same numerals, while new parts are denoted by new numerals.

In this embodiment the damping means 135 includes an annular ring 138 that has an inside diameter slightly smaller than the outside diameter of flange 28 so that during the "at rest" position, annular ring 138 may rest against the rear surface 54 of flange 28. Resilient means such as a helical spring 144 serve to urge annular ring 138 into this position. Annular ring 138 has formed therein a plurality of axial orifices 140 in the manner of an annular ring 38 in the just described embodiment.

INDUSTRIAL APPLICABILITY OF THE SECOND MODE

Operation of the second embodiment is quite similar to the first embodiment and will be described in the same context of the rock breaker.

Movement of intermediate link 12 in the upward direction as shown in FIG. 3 results in a fluid contained in portion 26a of cavity 26 passing freely around flange 28 and the opening formed between forward surface 150 of annular ring 138 and lower surface 54 of flange 28. As recoil starts, annular ring 138 is urged upwardly by helical spring 144 to come into contact with surface 54 of flange 28 thus blocking communication of fluid through the opening between surfaces 54 and 150. Fluid is then forced through orifice 140 as intermediate impact link 12 moves. Such flow of fluid through orifice 140 retards the movement of intermediate impact link 12 in the downward direction.

Other aspects, objects, and advantages of this invention can be obtained from a study of the drawings, the disclosure, and the appended claims.

We claim:

1. A recoil damper (10) comprising
   a housing (24),
   an impact link (12) reciprocally mounted in said housing (24) for movement in first and second opposite directions,
   a shank (14) having a tip (16) thereon,
   eccentric means (18) for intermittently reciprocating said impact link (12) and said shank (14),
   a radial flange (28) on said impact link (12),
   first (26a) and second (26c) cavities defined in said housing (24) on opposite sides of said flange (28) and containing a damping fluid therein, and
   damping means (35/135) for restricting flow of said damping fluid from said second cavity (26c) to said first cavity (26a) in response to compression of damping fluid in said second cavity (26c) by said flange (28) when said impact link (12) is moved in said first direction and for permitting relatively free flow of damping fluid from said first cavity (26a) to said second cavity (26c) in response to compression of damping fluid in said first cavity (26a) by said flange (28) when said impact line (12) is moved in said second direction.

2. The recoil damper (10) of claim 1 wherein said damping means (35/135) comprises an annular ring (38/138) positioned between said first (26a) and second (26c) cavities.

3. The recoil damper (10) of claim 2 wherein said damping means (35/135) further comprises means (42/144) for biasing said annular ring (38/138) in said second direction.

4. The recoil damper (10) of claim 2 further comprising a plurality of orifices (40/140) formed axially through said ring (38/138).

5. The recoil damper (10) of claim 2 wherein said annular ring (38) is slidably mounted on the periphery of said flange (28).

6. The recoil damper (10) of claim 2 wherein said annular ring (138) has an inside diameter less than an outside diameter of said flange (28) and is positioned on an axial side of said flange (28).

7. A hydraulic piston damper (10), comprising:
   a housing (24) having a piston bore (25) providing opposite end portion (30,32);
   a fluid cavity (26) in the housing (24) communicating with said piston bore (25) intermediate said end portions (30,32) thereof;
   a reciprocal piston (12) axially slidably disposed in said piston bore (25) and having a radially outwardly extended flange (28) projecting into said cavity (26) in fluid pumping relation to a fixed volume of trapped fluid within the cavity (26);
   a damper control member (35) disposed for axial sliding movement within said cavity (26) relative to said flange (28) and providing a restricted orifice (40,140); and
   spring means (42) for biasing said control member (35) toward a position blocking the flow of fluid past said flange (28) to force fluid through said orifice (40,140) in dampening relation to movement of said piston (12) in one axial direction of travel, and said control member (35) being responsive to fluid pressure within said cavity (26) for movement to a position providing substantially unrestricted flow of fluid past said flange (28) during travel of said piston (12) in an opposite axial direction.

8. The piston damper (10) of claim 7 in which said control member (35) effectively divides said cavity (26) into opposed discrete compartments located substantially entirely radially outwardly of said flange (28) of the piston (12) which are alternately opened and closed with respect to each other during reciprocation of said piston (12).

9. The piston damper (10) of claim 8 in which said piston (12) is cylindrical and provides opposite power and recoil strokes; said control member (35) is an annular ring (38) disposed in circumscribing relation to said piston (12); and
   said spring means (42) includes a plurality of compression springs disposed within one compartment of said cavity (26) and providing only a minimum of resistance to said fluid pressure in the opposite compartment during said power stroke of the piston (12) and effective to position said ring (38) in its blocking position prior to initiation of said piston (12) to its recoil dampening stroke.

10. The piston damper (10) of claim 9 in which said flange (28) on the piston (12) and said control ring (38) are radially overlapping for sealing engagement with each other when the ring (38) is in said blocking position.

11. The piston damper (10) of claim 9 in which said control ring (38) is disposed in circumscribing relation to said flange (28) on the piston (12); and
   said cavity being defined by a wall having a portion adapted to be engaged in sealing relation by said ring (38) in its blocking position.

* * * * *

UNITED STATES PATENT AND TRADEMARK OFFICE
CERTIFICATE OF CORRECTION

PATENT NO.   :   4,703,838
DATED        :   November 3, 1987
INVENTOR(S)  :   Michael A. Roussin and Delwin E. Cobb It is certified that error appears in the above-identified patent and that said Letters Patent is hereby corrected as shown below:

Assignee: "Caterpillar Tractor Co." should be --Caterpillar Inc.--.

In the Abstract, line 4, "reciprocation" should be --reciprocating--.

Column 5, line 51, claim 1, "line" should be --link--.

Signed and Sealed this

Second Day of August, 1988

Attest:

DONALD J. QUIGG

Attesting Officer

Commissioner of Patents and Trademarks